(12) United States Patent
He et al.

(10) Patent No.: US 7,652,699 B2
(45) Date of Patent: Jan. 26, 2010

(54) COLOR IMAGE SENSOR WITH TUNABLE COLOR FILTER

(75) Inventors: Fan He, Grayslake, IL (US); Michael W. Frenzer, Palatine, IL (US); Zili Li, Barrington, IL (US); Carl Lynn Shurboff, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 721 days.

(21) Appl. No.: 11/215,887

(22) Filed: Aug. 30, 2005

(65) Prior Publication Data

US 2007/0046794 A1    Mar. 1, 2007

(51) Int. Cl.
*H04N 3/14* (2006.01)
*H04N 5/335* (2006.01)
(52) U.S. Cl. .......................... 348/272; 348/308
(58) Field of Classification Search .......... 348/272
See application file for complete search history.

(56) References Cited

U.S. PATENT DOCUMENTS

| | | | |
|---|---|---|---|
| 6,545,653 B1 * | 4/2003 | Takahara et al. ........... 345/87 |
| 6,630,982 B2 | 10/2003 | Li | |
| 6,864,557 B2 * | 3/2005 | Turner et al. ............. 257/440 |
| 7,129,466 B2 * | 10/2006 | Iwasaki ................. 250/214.1 |
| 7,508,434 B2 * | 3/2009 | He et al. ................. 348/308 |
| 2002/0171102 A1 * | 11/2002 | Shizukuishi ............. 257/315 |
| 2003/0098918 A1 * | 5/2003 | Miller ..................... 348/273 |
| 2004/0178466 A1 * | 9/2004 | Merrill et al. ............ 257/440 |
| 2005/0062906 A1 * | 3/2005 | Ishizaki .................. 349/96 |
| 2005/0099373 A1 | 5/2005 | Funfschilling et al. | |

FOREIGN PATENT DOCUMENTS

| WO | 9819455 A1 | 5/1998 |
| WO | 0005874 A1 | 2/2000 |

OTHER PUBLICATIONS

CS26501RL; PCT/US2006/027085; PCT Search Report and Written Opinion; Jan. 17, 2007; 11 pages.

* cited by examiner

*Primary Examiner*—Lin Ye
*Assistant Examiner*—Amy Hsu
(74) *Attorney, Agent, or Firm*—Gary J. Cunningham

(57) ABSTRACT

An apparatus (20) for recording a color image, comprises an image sensor (22) having a plurality of pixels (24) formed in a monolithic substrate. Each of the plurality of pixels (24) includes three floating gate semiconductor devices (80, 82, 84). A color tunable filter (30) is positioned between a photosensitive semiconductor device (86) and an electromagnetic radiation source. A FET transistor (130) has a drain (134) connected to the cathode (120) of the photodiode (86), and a source (136) connected to the anode (118) of the photodiode (86) and to control gates (94, 104, 114) of each of the three floating gate semiconductor devices (80, 82, 84). The color tunable filter (30) allows all desired combinations of colors to pass while each of the three floating gate semiconductor devices (80, 82, 84) are respectively selected to store the color image.

25 Claims, 7 Drawing Sheets

COLOR IMAGE SENSOR WITH TUNABLE COLOR FILTER

FIELD OF THE INVENTION

The present invention generally relates to image sensors, and more particularly to a tunable color image sensor architecture having floating gate devices.

BACKGROUND OF THE INVENTION

Presently, semiconductor based image sensors are widely used, especially in digital cameras. These cameras exist as both stand-alone devices and as integrated in other multipurpose electronic devices such as cell phones or personal digital assistants (PDAs).

The marketplace continues to drive for improvements in image capture. These improvements include not only the quality of the captured images, such as improved color accuracy and resolution, but also the lowest possible cost and smallest size.

A common method to capture color information in cameras using semiconductor based image sensors is to employee a mosaic, such as a Bayer pattern, of alternating red, green, and blue pixels. The light reaching these pixels is filtered by corresponding red, green, or blue light filter films made out of materials such as polyimide. However, this method causes several problems. First, conventional RGB filters significantly attenuate the light. It is common for the green and red filters to have less than 40% transmittance and the blue filter to have less than 25% transmittance. This reduction in transmitted light leads to a major decrease in the sensitivity of the sensor array. Second, the film filters commonly used have considerable spectrum overlap. For example, the red filter allows some green light to pass, the green filter allows some red and blue light to pass, and the blue filter allows some green light and red light to pass. This makes determination of the true colors of an image very difficult. Third, the general use of a mosaic of pixels, such as a Bayer pattern, to determine color, degrades the potential spatial resolution of a given array. The amount of degradation depends on lighting conditions but can approach 75% for high resolution systems. For example, a lens with a module transfer function (MTF) value of 0.7 at 100 lp/mm may only provide an MTF of 0.7 at 25 lp/mm for a module with a Bayer mosaic semiconductor image sensor.

Another known method for capturing color information involves Foveon sensors. With the Foveon design, color filtering is achieved by selective absorption of the light through the sensor semiconductor substrate. Like the systems using color films, the Foveon type system still suffers from considerable color spectrum overlap between the different color sensors, thus making the determination of true color by the system difficult. For example, the signal from a blue sensor will have about 35% green light contribution and 10% red light contribution under sunlight conditions. This problem is further aggravated by the fact that the contribution from each color will change under different lighting conditions such as office light vs. sunlight.

Another known method for color filtering that could be applied to imagers is disclosed in U.S. Patent Application Publication 2005/0099373 A1. This method uses a conventional passive color comprised of circularly polarizing selective reflection bands of at least four cholesteric filters together with three liquid crystal switches and related retarder layers. Because this filter only works with polarized light, it is not suitable for cameras used in outdoor and most indoor photography as sunlight and most artificial light sources generate non-polarized light.

Accordingly, it is desirable to provide a new color image sensor system. This system employs a tunable stack of liquid crystal display (LCD) filters which are used to pass a sequence of different colors of light to a sensor array. The system also employs a sensor array optimized to store sequential light information. Furthermore, other desirable features and characteristics of the present disclosure will become apparent from the subsequent detailed description of the disclosure and the appended claims, taken in conjunction with the accompanying drawings and this background.

BRIEF DESCRIPTION OF THE DRAWINGS

The present disclosure will hereinafter be described in conjunction with the following drawing figures, wherein like numerals denote like elements.

DETAILED DESCRIPTION OF THE INVENTION

The following detailed description is merely exemplary in nature and is not intended to limit the invention or the application and uses of the disclosure. Furthermore, there is no intention to be bound by any theory presented in the preceding background or the following detailed description.

Figure 1:
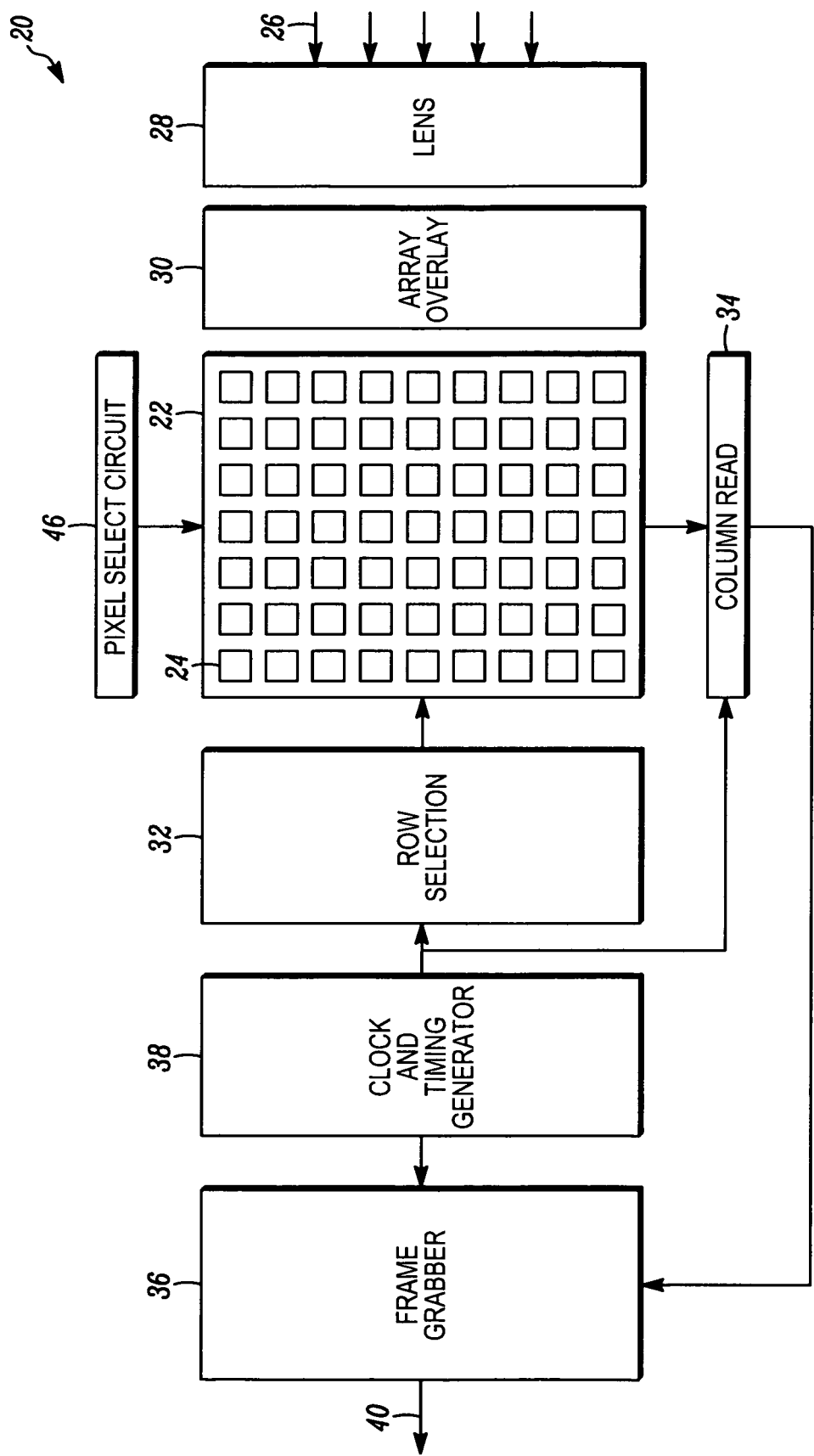
FIG. 1 is a system block diagram of an exemplary embodiment of an image acquisition circuit.

FIG. 1 illustrates an image acquisition system, shown generally at 20, that employs an image sensor array 22 comprising a plurality of pixel circuits 24. As shown, the pixel circuits 24 are arranged in the array 22 in a plurality of rows and columns. Each row of pixel circuits 24 may be individually addressed and, if desired, the output signals from an activated row may be read concurrently.

Electromagnetic radiation 26 from an image source is directed through a lens 28 and array overlay 30 onto photosensitive components of the individual pixel circuits 24. Two different embodiments of the array overlay 30 are described later. In both cases, the array is used to provide a temporal sequence of varying light filters to the light that is passed to the sensor array 22. Also, in both cases, cholesteric liquid crystal filters can be utilized. Cholesteric liquid crystal filters can be capable of both better light transmission and much more accurate color filtering than the more commonly used film type color filters.

A row selection circuit 32 is used to activate the readout of the pixel circuits 24 in a given row of the image array 22. The output signals from the pixel circuits 24 in the activated row are provided to a column read circuit 34. Column read circuit 34 may be constructed in any number of different manners. For example, column read circuit 34 may comprise a single correlated double sampling (CDS) circuit that selectively reads individual columns of the array 22 when a single row of the array is selected through the row selection circuit 32. In an alternate exemplary embodiment, a plurality of CDS circuits may be used so that each column of the array 22 (or even fewer than all columns) may be concurrently read by a respective CDS circuit. In other exemplary embodiments, circuits providing a single readout from each pixel circuit 24 during a single read cycle may be employed thereby negating the need for CDS circuitry. Preferably, the analog signals from the pixel circuits 24 are converted by the column read circuit 34 to a digital format which is then arranged into an image frame by a frame grabber 36. Timing for the various operations executed by system 20 is preferably coordinated by a clock and timing generator circuit 38 or the like. Frame grabber 36 may itself execute a number of image processing routines (i.e., image compression, enhancement, etc.) or provide image data at output 40 processing by one or more further systems.

Figure 2:
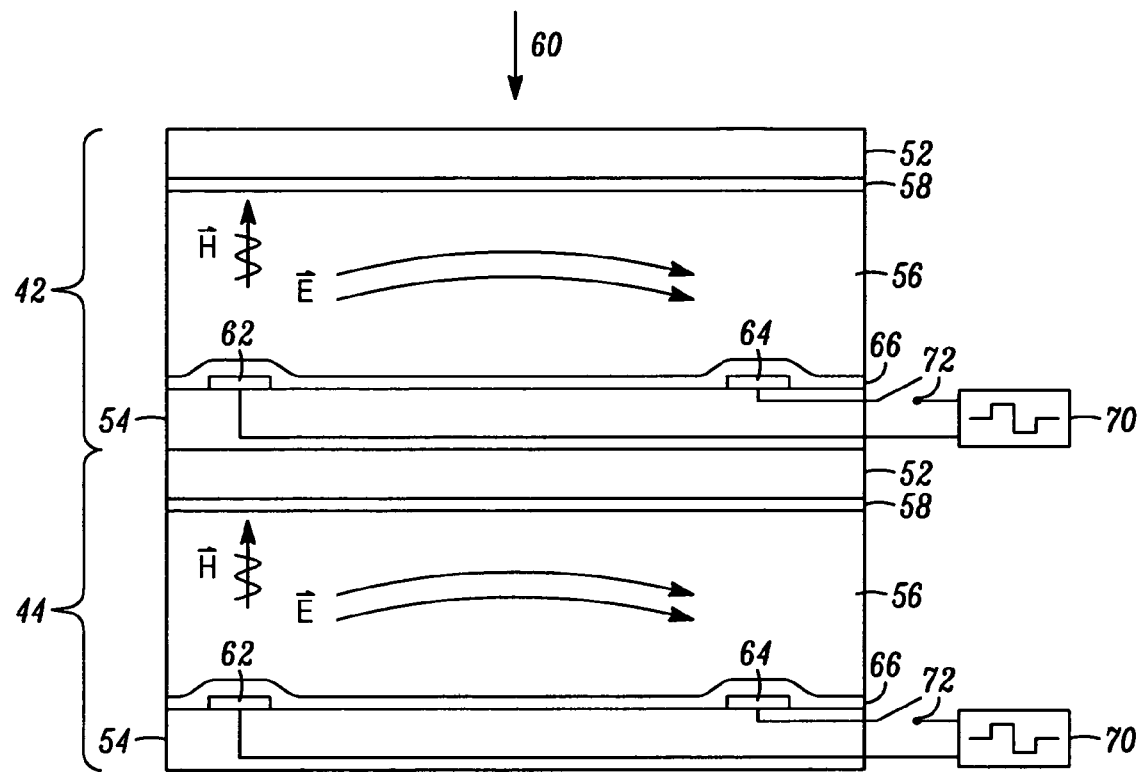
FIG. 2 is a schematic fragmentary sectional elevation view of a color tunable filter used with a first exemplary embodiment.

Referring to FIG. 2, this first embodiment of the array overlay 30 comprises two cholesteric liquid crystal filters 42, 44. The filters 42, 44 are structured so one will pass Left-circularly polarized light and the other will pass Right-circularly polarized light. The effectiveness of the light reflection or blocking depends on several cholesteric liquid crystal parameters such as thickness of the cholesteric liquid crystal and refractive index. Theoretically, this left and right combination blocks all incoming light which falls into the reflection band of the cholesteric liquid crystal in terms of wavelength. However, in reality there could be some small amount of leakage and the cholesteric liquid crystal needs to be optimized in conjunction with the underlying photosensitive semiconductor layer to achieve overall performance level requirement. The filters 42, 44 each comprise parallel first and second walls 52, 54. The first wall 52 and the second wall 54 are transparent so as to allow light that is modulated to enter the filters 42, 44. The second wall 54 of filter 42 and the first wall 52 of filter 44 may comprise a single wall.

A cholesteric liquid crystal 56 is disposed between the first and second walls 52, 54. The cholesteric liquid crystal 56 is preferably a dual frequency liquid crystal material that has a dielectric anisotropy of a first sign over a first range of frequencies, and a dielectric anisotropy of a second sign over a second range of frequencies. Dielectric anisotropy is the difference between the relative permittivity measured parallel to the axes of elongated molecules that make up the cholesteric liquid crystal, and the relative permittivity measured perpendicular to the axes of the molecules.

An alignment layer 58 is supported on the first wall 52 facing the cholesteric liquid crystal 56. The alignment layer 58 preferably comprises a rubbed polymer, e.g., polyimide, and causes the cholesteric liquid crystal 56 to align itself with its helical axis 60 perpendicular to the alignment layer 58 and the first wall 52.

First and second electrodes 62, 64 are supported in spaced relation on the second wall 54. First and second electrodes 62, 64 are substantially co-planer as shown, but each may comprise a plurality of interdigitized fingers as shown in U.S. Pat. No. 6,630,982.

A second alignment layer 66 could be used on the second wall 54 facing the cholesteric liquid crystal 56 and covers the first and second electrodes 62, 64. This second alignment layer 66 is preferably a polymer, and more preferably polyamide, which promotes the above mentioned alignment of the cholesteric liquid crystal 56 in which the helical axis 60 is perpendicular to the alignment layer 58 and the first wall 52.

A drive signal source 70 is coupled to the first and second electrodes 62, 64 when a switch 72 is closed. When the switch is open (as shown), the cholesteric liquid crystal 56 is arranged in a known helical structure which typifies cholesteric liquid crystals. As the signal from the drive signal source 70 is changed, the molecules of the cholesteric liquid crystal 56 rotate according to the electrical field direction and this molecular rotation results a reflected wavelength shift from shorter wavelength to longer wavelength. In terms of color, this corresponds to a color shift from blue to red in the visible range. The intensity control is also described in the U.S. Pat. No. 6,630,982. It can be accomplished with dual frequency driving schemes or time division method.

Figure 3:
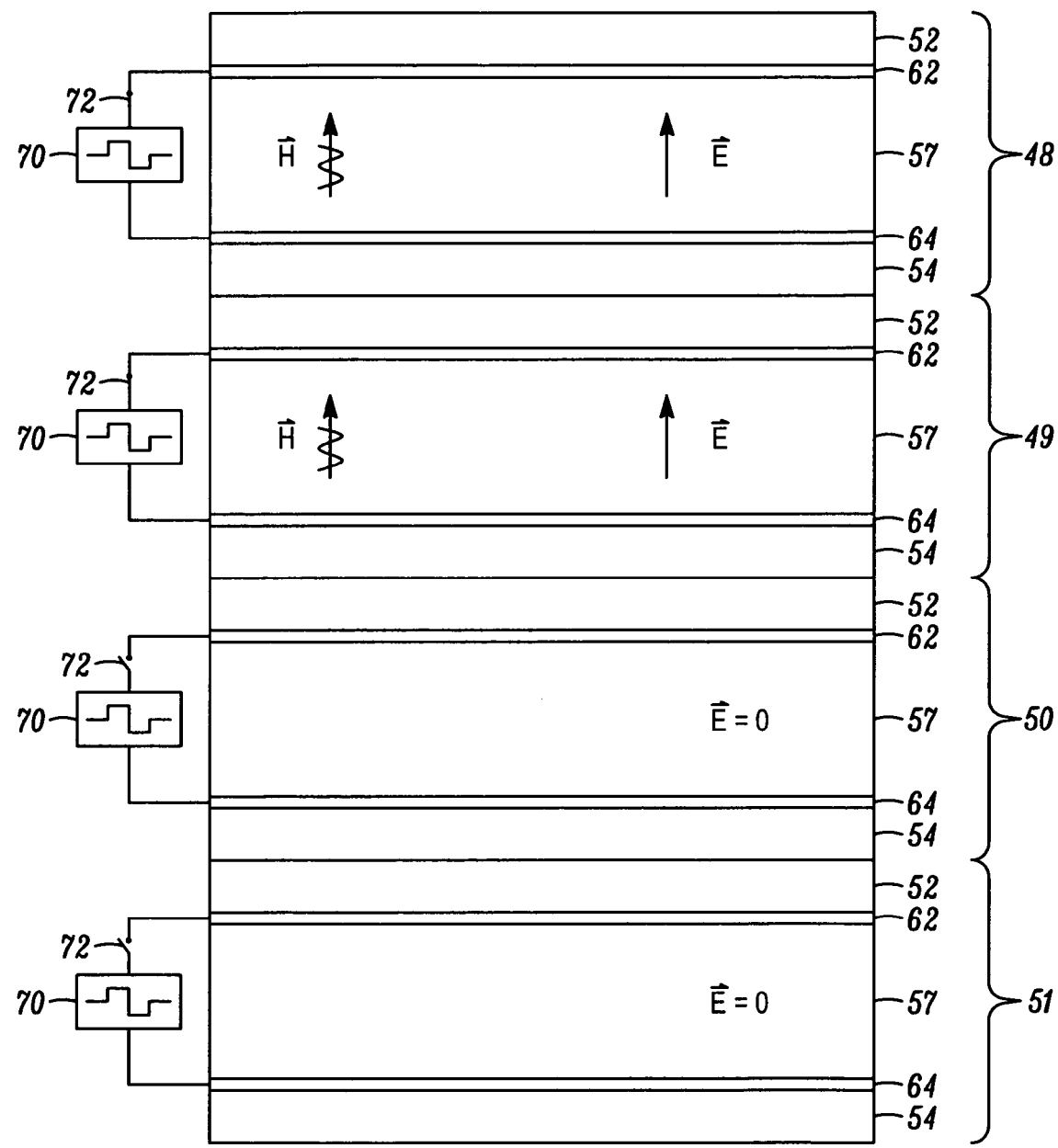
FIG. 3 is a schematic fragmentary sectional elevation view of a color tunable filter used with a second exemplary embodiment.

FIG. 3 shows a different type of liquid crystal filter 48, 49, 50, 51 with cholesteric liquid crystal sandwiched between the electrodes 62, 64. In this design, the filter reflection spectrum is fixed, not tunable with voltage and frequency like the design shown in FIG. 2. When energized, the liquid crystal 57 will reflect light in the spectrum determined by its helix structure pitch. Thus, two filters are required to reflect the red light, and two filters are required to reflect the blue light. A total of four filters 48, 49, 50, 51 in a sequential arrangement are required to realize the unpolarized color filter function.

Therefore, the array overlay 30 alternatively may comprise first thru fourth cholesteric liquid crystal filters 48, 49, 50, 51 which are preferably similar in structure. Each of the filters 48, 49, 50, 51 comprise parallel first and second walls 52, 54. The first wall 52 and the second wall 54 are transparent so as to allow light that is modulated to enter the filter 48, 49, 50, 51. The adjoining walls of filters 48, 49, 50, 51 may comprise a single wall.

Figure 4:
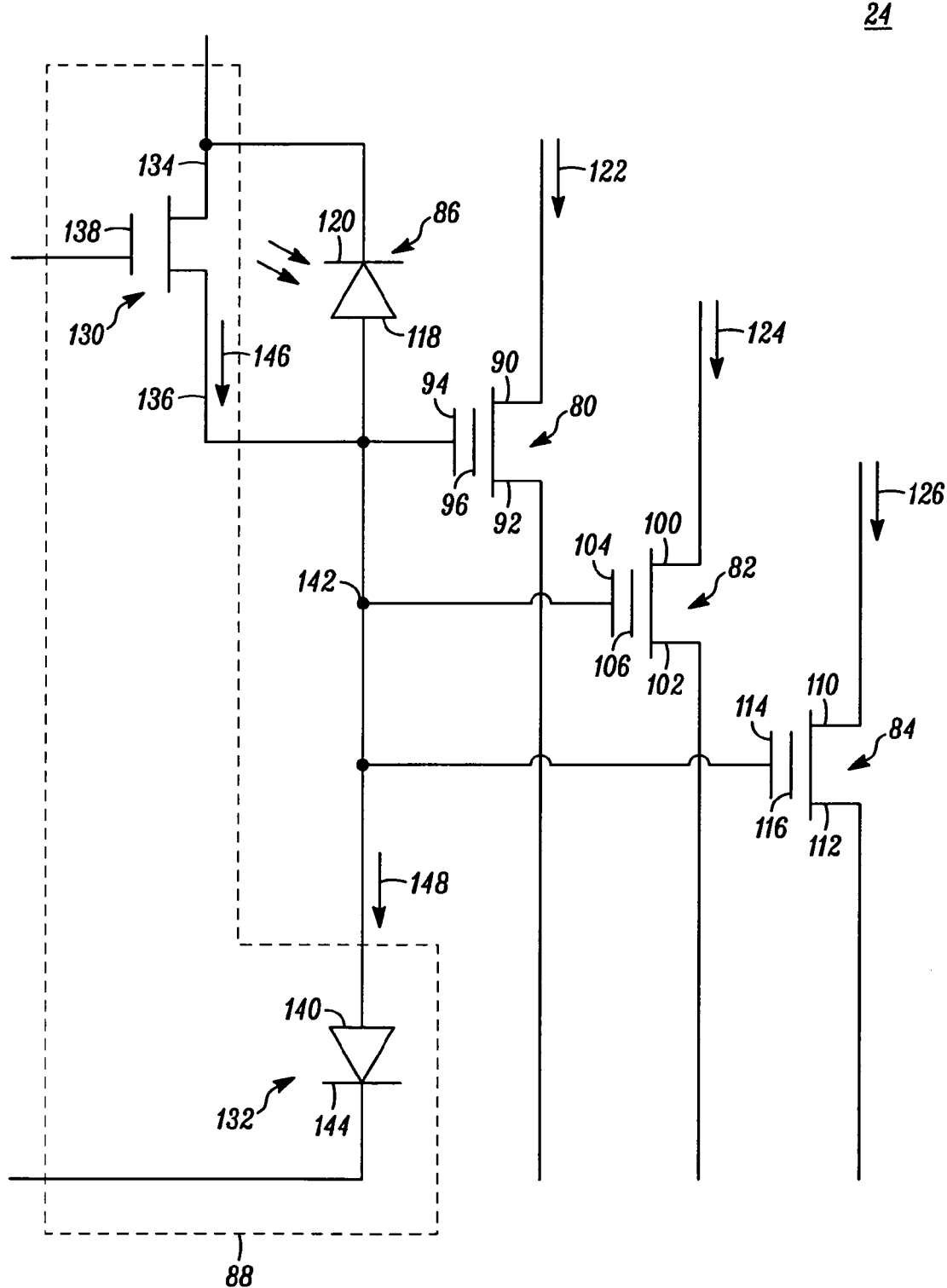
FIG. 4 is an exemplary schematic diagram of an exemplary embodiment of an improved pixel architecture.

Referring to FIG. 4, an exemplary embodiment of a pixel circuit, or control circuit, 24 suitable for use in the image array 22 of image acquisition system 20 is shown. In this exemplary embodiment, each pixel circuit includes three storage devices and one photodiode. The photodiode is sequentially exposed to three different colors of light by changing the settings of the array overlay. Each of the three storage devices records the amount of light received at the photodiode, after filtering, for each different color filter setting. However, it should be understood that any number of storage devices ranging from one to a higher number could by used. In the case of one storage device, the storage device would sense, store, and be read for the electromagnetic radiation with each tuning of the array overlay 30 for separate colors.

For the exemplary embodiment shown, pixel circuit 24 comprises first, second, and third floating gate semiconductor devices 80, 82, 84, a photosensitive semiconductor device 86 and a pixel control circuit 88. Though floating gate semiconductor devices are shown, it should be understood that any type of transistor could be used. The floating gate semiconductor device 80 includes a drain 90, a source 92, a control gate 94 and a floating gate 96. The floating gate semiconductor device 82 includes a drain 100, a source 102, a control gate 104 and a floating gate 106. The floating gate semiconductor device 84 includes a drain 110, a source 112, a control gate 114 and a floating gate 116. In the illustrated exemplary embodiment, the photosensitive semiconductor device 86 may be a pinned photodiode that is positioned for exposure to electromagnetic radiation from an image that is to be detected. The photodiode 86 of the illustrated exemplary embodiment includes an anode 118 and a cathode 120.

The pixel control circuit 88 is connected to direct the floating gates of semiconductor devices 80, 82, 84 and the photodiode 86 to a plurality of controlled modes. These controlled modes include at least an erase mode and an exposure mode, and may include a read mode and a data retention mode. In the erase mode, at least a portion of an electric charge is removed from the floating gates 96, 106, 116. The voltage across photodiode 86 may also be raised while in the erase mode. In this manner, both the floating gate semiconductor devices 80, 82, 84 and photodiode 86 are placed in an initialized state.

In the exposure mode, the floating gates 96, 106, 116 are charged at least partially in response to a voltage at a terminal of the photosensitive semiconductor device 86. In the illustrated exemplary embodiment, the floating gates 96, 106, 116 are charged at least partially in response to the voltage at the anode 118 of photodiode 86. The voltage at anode 118 is dependent on the degree to which photodiode 86 is exposed to the electromagnetic radiation from the image source. More particularly, there will be a voltage drop across photodiode 86 that corresponds to the electromagnetic radiation exposure. The greater the exposure that photodiode 86 experiences, the greater the voltage drop that will occur across photodiode 86 thereby reducing the voltage at control gates 94, 104, 114.

Pixel control circuit 88 may also direct photodiode 86 and floating gate semiconductor devices 80, 82, 84 to a data retention mode. In the data retention mode, the charge on the floating gates 96, 106, 116 acquired during the exposure mode is maintained. Notably, the charge on the floating gates 96, 106, 116 remain generally constant even though the voltage drop across photodiode 86 may change. For example, once the floating gates 96, 106, 116 have been charged during the exposure mode, the charge may be maintained on the floating gates 96, 106, 116 almost indefinitely even if the photodiode 86 continues to be exposed to electromagnetic radiation from the image source.

Pixel control circuit 88 may also direct photodiode 86 and floating gate semiconductor devices 80, 82, 84 to a read mode to effectively sense the charge placed on floating gates 96, 106, 116 during the exposure mode. In the illustrated exemplary embodiment, the charge on floating gates 96, 106, 116 alters the threshold voltage $V_T$ of the floating gate semiconductor devices 80, 82, 84. Consequently, a predetermined voltage $V_{CS}$ may be provided between the control gates 94, 104, 114 and sources 92, 102, 112, respectively, to produce a current 122 between the drain 90 and source 92 that corresponds to the charge on floating gate 96, a current 124 between the drain 100 and source 102 that corresponds to the charge on floating gate 106, and a current 126 between the drain 110 and source 112 that corresponds to the charge on floating gate 116.

As shown, pixel control circuit 88 may include a transistor switch 130 and a diode 132. Transistor switch 130 may be a field effect transistor, such as a MOSFET or the like, having a drain 134, source 136 and control gate 138. Control gate 138 is connected to receive a row read signal from, for example, row selection circuit 32 of FIG. 1. The drain 134 and source 136 of MOSFET 130 are respectively connected to the cathode 120 and anode 118 of photodiode 86. Diode 132 includes an anode 140 that is connected to a node 142 that includes the source 136 of MOSFET 130 and the control gates 94, 104, 114 of floating gate semiconductor devices 80, 82, 84. Diode 132 also includes a cathode 144 that is connected to receive a reset/erase signal. Various components used to generate the operating voltage levels at the drain 134, drain 110 and source 112 are not illustrated but are well within the design capabilities of those skilled in the art given the detailed description of the various controlled modes set forth herein.

The various modes of operation mentioned above will now be explained. Exemplary voltage levels for operating in these modes are identified. However, it will be recognized that the specific voltage levels required to operate the pixel architecture 22 in the various modes will depend on the characteristics of the individual devices that are employed.

In the erase mode of operation, drains 134, 122, 124, and 126 as well as sources 92, 102, 112 are driven to +8 V while the row read signal at gate 138 and the reset/erase signal at cathode 144 are driven to −8 V. This places floating gate semiconductors 80, 82, 84 and MOSFET 130 into non-conductive states so that currents 122, 124, 126 and current 146 are approximately zero. The diode 132 is forward biased to discharge floating gates 96, 106, 116. At least a portion of the resulting discharge current is directed to the anode 140. Additionally, photodiode 86 is charged to an initial state with a voltage drop of approximately 15.2 VDC.

In the exposure mode of operation, drains 90, 100, 110 and cathode 144 are sequentially driven to +8 V in synchronization with the tunable color filter while the row read signal at gate 138 and sources 92, 102, 112 are driven to 0 V. This places MOSFET 130 and diode 132 into non-conductive states so that current 146 and current 148 are approximately zero. Additionally, the voltage levels at drain 134 and cathode 120 are elevated to a "programming voltage" of +12 V. Photodiode 86 is exposed to electromagnetic radiation 26 which causes a corresponding decrease in the initial state voltage between the cathode 120 and anode 118. The voltage at control gates 94, 104, 114 reflects this voltage drop and thus corresponds to the amount of electromagnetic radiation detected at photodiode 86. This control gate voltage, in turn, determines the amount of charge placed on floating gates 96, 106, 116 during the exposure mode.

In the data retention mode of operation cathode 144 is driven to +8 V while the row read signal at gate 138 and sources 92, 102, 112 are driven to 0 V. This places MOSFET 130 and diode 132 into non-conductive states so that current 146 and current 148 are approximately zero. The voltage level at cathode 120 of photodiode 86 is reduced to +8 V, thereby inhibiting further accumulation of charge on the floating gates 96, 106, 116. Drains 90, 100, 110 are open circuited, or otherwise connected to a high impedance load to prevent current flow through the floating gate semiconductor devices 80, 82, 84. Currents 122, 124, 126 are therefore approximately zero. In this state, the charge on floating gates 96, 106, 116 can remain relatively constant over a prolonged period of time. Since the charge on floating gates 96, 106, 116 can be retained within the individual pixel circuits 24 of the image array 22, the image processing requirements imposed on peripheral circuits, if any, can be relaxed. The cost and complexity of any such image processing peripheral circuits can therefore be reduced, if desired.

In the read mode of operation, drains 134, 90, 100, and 110, gate 138 and cathode 144 are driven to +8 V while the sources 92, 102, 112 are driven to 0 V. This places control gates 94, 104, 114 at a fixed voltage of approximately +8 V with respect to sources 92, 102, 112, respectively. As such, $V_{CS}$ is approximately +8 V and the currents 122, 124, 126 proceeding selectively from the pixel select circuit 46 through the pixel output corresponds to the charge on floating gates 96, 106, 116. Conversion of currents 122, 124, 126 into an appropriate digital signal may take place in the column read circuit 34, which may be implemented in any number of different manners as understood by those of ordinary skill in the art.

Figure 5:
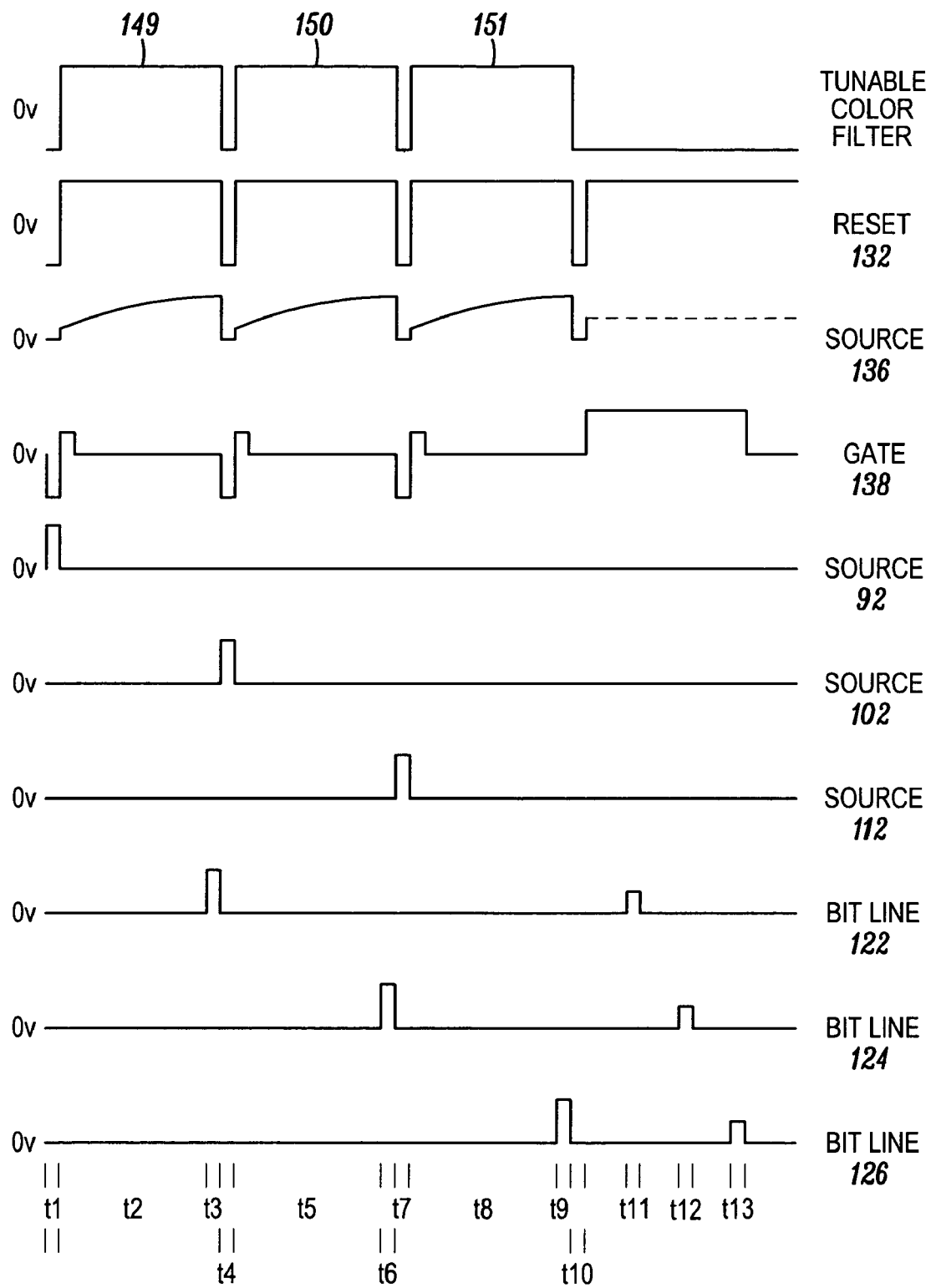
FIG. 5 is a timing chart for an exemplary method of operation of the pixel architecture of FIG. 4.

The sequence of steps to capture image sensor information, including the control of both the sensor array and the array overlay, as illustrated in FIG. 5 are described below. Note that this example assumes using a color filter sequence of 1) no filter 149 so the sensor sees white light, 2) a red filter 150 so the sensor sees cyan light, and 3) a blue filter 151 so the sensor sees yellow light. The information obtained with this combination of filter settings can be used to derive RGB (Red Green Blue) information as follows:

Red=White−Cyan

Green=Cyan+Yellow−White

Blue=White−Yellow

Other combinations of filters are acceptable. One such example would be: 1) no filter so the sensor sees white light, 2) a blue filter so the sensor sees yellow light, and 3) a green filter so the sensor sees purple light. The information obtained with this combination of filter settings can also be used to derive RGB (Red Green Blue) information as follows:

Red=Purple+Yellow−White

Green=White−Purple

Blue=White−Yellow

The steps are as follows:
t1: photo diode 86 and first floating gate 96 are reset;
t2: photo diode 86 collects charge due to exposure, filters are off so the full visible spectrum light goes through;
t3: bit line 122 goes high to charge the first floating gate 96 to store white light exposure;
t4: photo diode 86 and second floating gate 106 are reset;
t5: photo diode 86 collects charge due to exposure, red color filter is on so cyan light goes through;
t6: bit line 124 goes high to charge the second floating gate 106 to store the cyan light exposure;
t7: photo diode 86 and third floating gate 116 are reset;
t8: photo diode 86 collects charge due to exposure, blue color filter is on so yellow light goes through;
t9: bit line 126 goes high to charge the third floating gate 116 to store the yellow light exposure;
t10: photo diode 86 is reset;
t11: bit line 122 connects to readout circuit so the impedance on bit line 122 can be read;
t12: bit line 124 connects to readout circuit so the impedance on bit line 124 can be read; and
t13: bit line 126 connects to readout circuit so the impedance on bit line 126 can be read.

Figure 6:
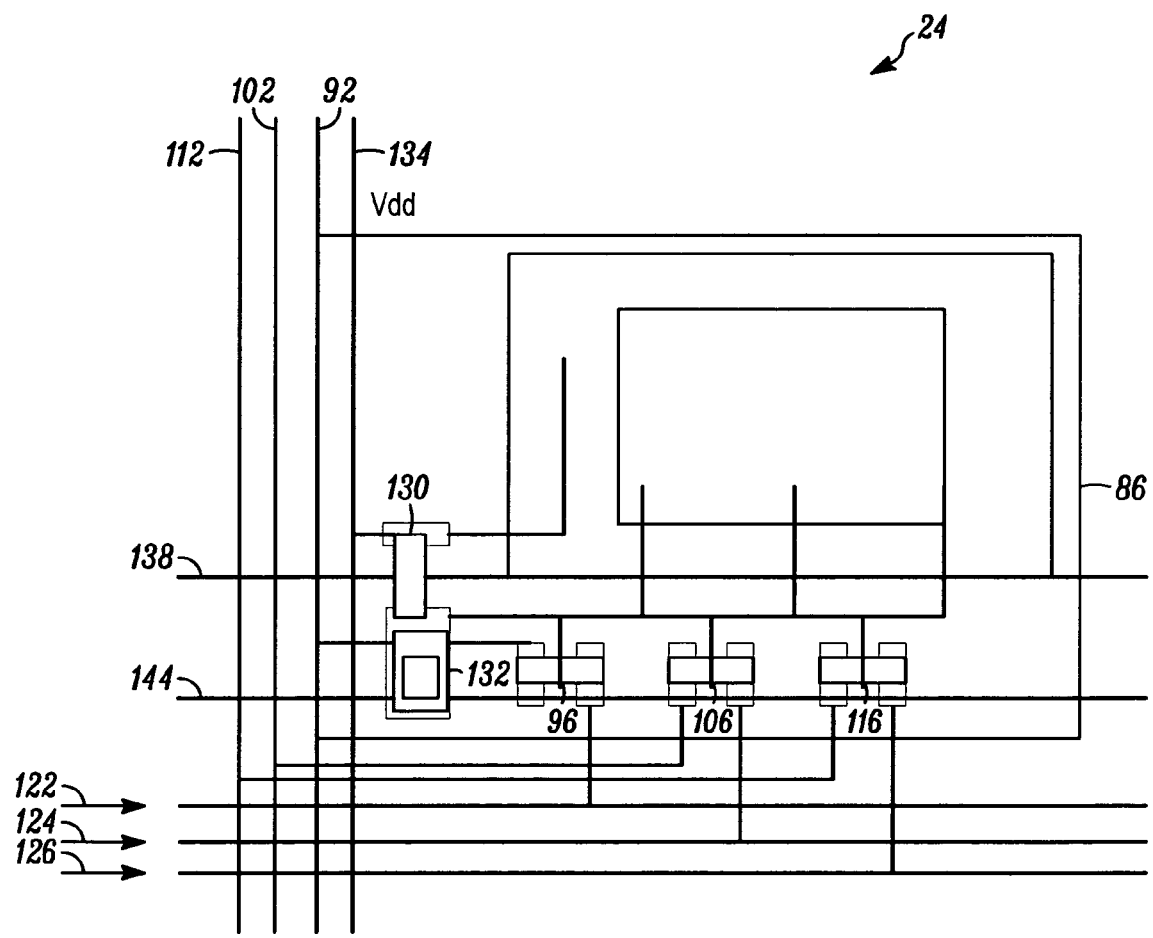
FIG. 6 is an exemplary plan layout for the components of the pixel architecture FIG. 2 in a monolithic substrate.

The pixel architecture 24 is easily implemented in a monolithic substrate. More particularly, the pixel architecture 24 may be readily manufactured using existing CMOS manufacturing processes to form the image array 22 shown in FIG. 1. An exemplary plan layout for the components of pixel architecture 24 in a monolithic substrate is illustrated in FIG. 6. It will be recognized, however, that other layouts may be employed. Further, any of the peripheral components, such as row selection circuit 32, column read circuit 34, frame grabber 36 and clocking and timing generator 38 of FIG. 1 may likewise be integrated with the image array 22 in a monolithic substrate.

Because pixel architecture 24 is centered about floating gate semiconductor devices 80, 82, 84, the pixel, including the components necessary to implement the global reset function, can be implemented with fewer components when compared to a commonly used five transistor pixel architecture. In the specific pixel circuit architecture 24 shown in FIG. 3, only four transistors 80, 82, 84, and 130, and a single diode 132 are used in conjunction with photodiode 86, thereby facilitating a four transistor, one diode structure. By employing floating gate semiconductor devices 82, 84, 86, it becomes possible to place the pixel circuit 24 into various controlled modes by manipulating the voltage levels provided to the pixel circuit components as opposed to adding further switching transistors to achieve the same operations.

The reduction in the number of components employed to implement the pixel circuit 24 can be used to achieve any number of different objectives. For example, pixel circuit 24 may be implemented with a smaller substrate area than a five transistor design of comparable resolution and light sensitivity. A smaller substrate should be lower in cost to manufacture and may allow for a smaller overall imaging system. Alternatively, the pixel design could be implemented using the same size substrate as a five transistor design while offering larger photodiodes. Large photodiodes could allow for improved low light sensitivity and dynamic range. As disclosed herein, the pixel circuit 24 may employ higher operating voltages during the exposure mode, thereby improving the performance of photodiode 86.

Pixel circuit 24 may also be implemented so that the read mode of operation is similar to the readout methods employed in conventional CMOS image sensors. For example, each pixel circuit 24 may be individually addressed to achieve the same windowing and sub-sampling advantages that exist in conventional CMOS sensors thereby obviating the need for substantial redesign of corresponding peripheral readout components. Further, the floating gate semiconductor devices 80, 82, 84 do not have charge leakage issue and they does not have charge recombination issues as a result of under visible light illumination. Thus, it does not have the fading issues associated with the commonly used five transistor CMOS architectures.

Figure 7:
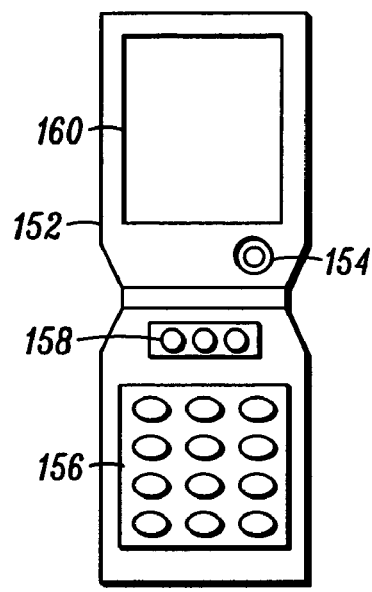
FIGS. 7 and 8 illustrate an exemplary cellular phone having a camera that employs the image acquisition circuitry shown in FIG. 1.
Figure 8:
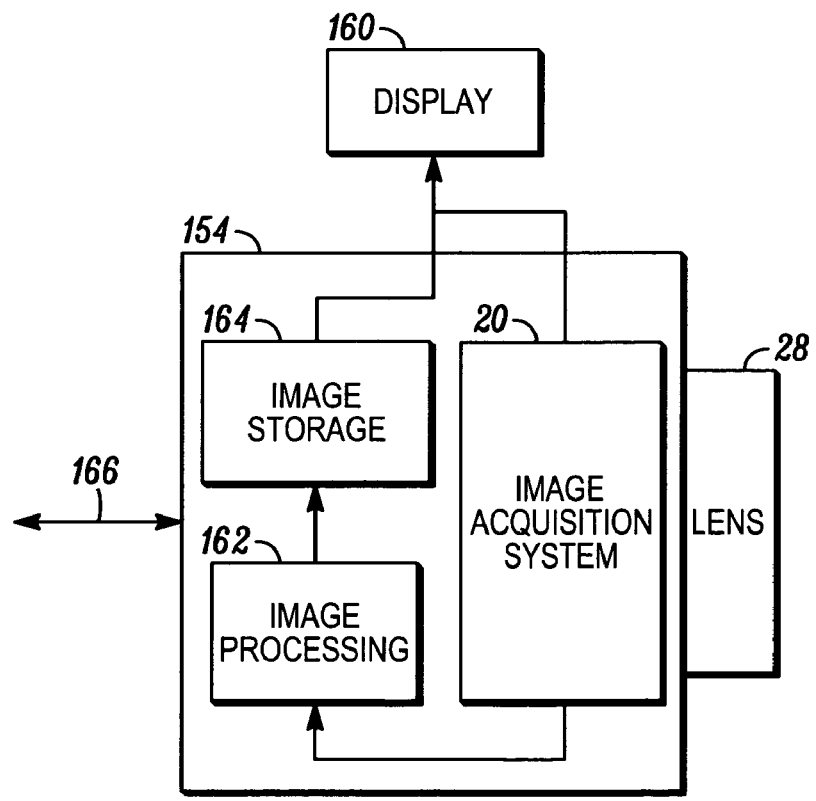

One embodiment of a cellular phone 152 that may include a camera that employs the image acquisition system 20 is shown in FIGS. 7 and 8. As shown, phone 152 includes a camera system 154, a keyboard 156, control keys 158 and a display 160. As noted above, image acquisition system 20 receives electromagnetic radiation from the image source through lens 26. The acquired image can be provided to an on-board image processing system 162 or directly to display 160 (i.e., for viewfinder functionality, etc.). Processed images may be stored in image storage 164 and provided to display 160 in response to user commands. Further, the images in image storage 164 may be read out for provision to a personal computer or the like via communication link 166.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing exemplary embodiments of the disclosure, it being understood that various changes may be made in the function and arrangement of elements described in an exemplary embodiment without departing from the scope of the disclosure as set forth in the appended claims.

What is claimed is:

1. An image sensor comprising:
    a plurality of pixel circuits, one each for controlling one of a plurality of pixels, comprising:
        a first floating gate semiconductor device having a first floating gate, a first control gate, a first drain and a first source;
        a second floating gate semiconductor device having a second floating gate, a second control gate, a second drain and a second source;

a third floating gate semiconductor device having a third floating gate, a third control gate, a third drain and a third source;

a photosensitive semiconductor device positioned for exposure to electromagnetic radiation from an image; and a pixel control circuit connected to direct the first, second, and third floating gate semiconductor devices and the photosensitive semiconductor device to a plurality of controlled modes, the controlled modes including:

an erase mode in which at least a portion of an electric charge is removed from the first, second, and third floating gates to place the first, second, and third floating gate semiconductor devices, respectively in an initialized state; and an exposure mode in which the first, second, and third floating gates are charged at least partially in response to a voltage at a terminal of the photosensitive semiconductor device while being sequentially selected as the color tunable filter allows all desired combinations of colors to pass, the voltage at the terminal corresponding to exposure of the photosensitive semiconductor device to the electromagnetic radiation from the image; and a color tunable filter positioned between the electromagnetic radiation and the photosensitive semiconductor device of each of the plurality of pixel circuits.

2. The image sensor of claim 1 wherein the controlled modes further include a data retention mode in which the charge on the first, second, and third floating gates acquired during the exposure mode is maintained thereon notwithstanding further exposure of the photosensitive semiconductor device to the electromagnetic radiation from the image.

3. The image sensor of claim 1 wherein the color tunable filter comprises a first cholesteric liquid crystal filter tuned to pass Left-circularly polarized electromagnetic radiation and a second cholesteric liquid crystal filter tuned to pass Right-circularly polarized electromagnetic radiation.

4. The image sensor of claim 1 wherein the color tunable filter comprises a first pair of cholesteric liquid crystal filters to reflect a first color and a second pair of cholesteric liquid crystal filters to reflect a second color.

5. The image sensor of claim 2 wherein the controlled modes further include a read mode in which current between the first source and first drain, the second source and second drain, and the third source and third drain is detected as an indicator of the charge on the first, second, and third floating gate, respectively.

6. The image sensor of claim 4 wherein the photosensitive semiconductor device is a photodiode having an anode and a cathode.

7. The image sensor of claim 6 wherein the pixel control circuit comprises:

a field effect transistor having a switch, a fourth control gate, a fourth drain connected to the cathode of the photodiode, and a fourth source connected to the anode of the photodiode, the fourth source and the anode of the photodiode being further connected to the first, second, and third control gates; and a diode having an anode connected to the first, second, and third control gates.

8. The image sensor of claim 7 wherein the erase mode comprises the field effect transistor switch and the first, second, and third floating gate semiconductor devices in non-conductive states, the photodiode at an initial voltage state, and the first, second, and third floating gates discharging through the diode.

9. The image sensor of claim 7 wherein the exposure mode comprises the field effect transistor switch and the diode each in a non-conductive state, the cathode of the photodiode raised to an exposure voltage level, and the first, second, and third drains and the first, second, and third source of the floating gate semiconductor devices having a voltage thereacross sufficient to charge the first, second, and third floating gates, respectively, in response to voltage levels at the anode of the photodiode.

10. The image sensor of claim 7 wherein the data retention mode comprises the field effect transistor switch and the diode each in a non-conductive state, the cathode of the photodiode at a retention voltage level, and the first, second, and third sources are effectively open circuited.

11. The image sensor of claim 7 wherein the read mode comprises a predetermined voltage at the first, second, and third control gates and a current between the first, second, and third drains and the first, second, and third sources, respectively indicative of the charge placed on the first, second, and third floating gates, respectively, during the exposure mode.

12. An image sensor having a plurality of pixels formed in a monolithic substrate, comprising:

one or more of the plurality of pixels comprising:

a first semiconductor device having a first control gate, a first drain and a first source;

a second semiconductor device having a second control gate, a second drain and a second source;

a third semiconductor device having a third control gate, a third drain and a third source;

a photodiode positioned for exposure to electromagnetic radiation from an image;

a field effect transistor having a fourth control gate, a fourth drain connected to the cathode of the photodiode, and a fourth source connected to the anode of the photodiode, the fourth source of the field effect transistor and the anode of the photodiode being further connected to the first, second, and third control gates;

a diode having an anode connected to the first, second, and third control gates; and a color filter positioned between the photosensitive semiconductor device and the electromagnetic radiation.

13. An image sensor for sensing electromagnetic radiation, comprising:

a color tunable filter; and one or more of the plurality of pixels formed in a monolithic substrate, comprising:

a plurality of pixel circuits, one each associated with one of the plurality of pixels, comprising:

a photodiode positioned for exposure to electromagnetic radiation from an image;

two or more floating gate memory elements per pixel to store sequential light information, wherein the color tunable filter is positioned between the photodiode and the electromagnetic radiation; and control circuitry for sequentially selecting three states for the color tunable filter and selecting the two or more memory elements for each of the three states for capturing the electromagnetic radiation by the photo diode after it has passed through the color tunable filter, and controlling a plurality of controlled modes, the controlled modes including:

an erase mode in which at least a portion of an electric charge is removed from the floating gates of said two or more floating gate memory elements to place said two or more floating gate memory elements in an initialized state; and an exposure mode in which said floating gates are charged at least partially in response to a voltage at a terminal of the photodiode while being sequentially selected as the color tunable filter allows all desired combinations of colors to pass, the voltage at the terminal corresponding to exposure of the photodiode to the electromagnetic radiation from the image.

14. An image sensor, comprising:

a color tunable filter disposed to receive electromagnetic radiation; and one or more of the plurality of pixels formed in a monolithic substrate, each comprising:

a photodiode positioned for exposure to electromagnetic radiation from an image;

a floating gate memory element to store sequential light information;

control circuitry for sequentially selecting three states for the color tunable filter and selecting the memory element for each of the three states for capturing the electromagnetic radiation by the photodiode after it has passed through the color tunable filter, and controlling a plurality of controlled modes, the controlled modes including:

an erase mode in which at least a portion of an electric charge is removed from the floating gate of said floating gate memory element to place said floating gate memory element in an initialized state; and an exposure mode in which said floating gate is charged at least partially in response to a voltage at a terminal of the photodiode while being sequentially selected as the color tunable filter allows all desired combinations of colors to pass, the voltage at the terminal corresponding to exposure of the photodiode to the electromagnetic radiation from the image.

15. A digital camera comprising:

an image sensor having an array of pixels, one or more of the pixels including:

a first floating gate semiconductor device having a first floating gate, a first control gate, a first drain and a first source;

a second floating gate semiconductor device having a second floating gate, a second control gate, a second drain and a second source;

a third floating gate semiconductor device having a third floating gate, a third control gate, a third drain and a third source;

a photosensitive semiconductor device positioned for exposure to electromagnetic radiation from an image; and a pixel control circuit connected to direct the first, second, and third floating gate semiconductor devices and the photosensitive semiconductor device to a plurality of controlled modes, the plurality of controlled modes including:

an erase mode in which at least a portion of an electric charge is removed from the first, second, and third floating gates to place the first, second, and third floating gate semiconductor devices in an initial state for exposure to the electromagnetic radiation;

an exposure mode in which the first, second, and third floating gates are charged at least partially in response to a voltage at a terminal of the photosensitive semiconductor device, the voltage at the terminal corresponding to exposure of the photosensitive semiconductor device to the electromagnetic radiation from the image; and a read mode in which a predetermined voltage is provided at the first, second, and third control gates and a current between the first, second, and third drains and the first, second, and third sources, respectively, is indicative of the charge placed on the first, second, and third floating gates during the exposure mode;

a color filter positioned between the photosensitive semiconductor device and the electromagnetic radiation;

an image sensor readout circuit connected to obtain image data from each of the pixels during the read mode; and a frame grabber connected to arrange image data obtained by the image sensor readout into an image frame.

16. The digital camera of claim 15 wherein the controlled modes further include a data retention mode in which the charge on the first, second, and third floating gates acquired during the exposure mode is maintained thereon notwithstanding further exposure of the photosensitive semiconductor device to the electromagnetic radiation from the image.

17. A method for operating a pixel in an image sensor, the pixel comprising a first floating gate semiconductor device having a first floating gate, a first control gate, a first drain, and a first source; a second floating gate semiconductor device having a second floating gate, a second control gate, a second drain, and a second source; a third floating gate semiconductor device having a third floating gate, a third control gate, a third drain, and a third source, a photosensitive semiconductor device positioned for exposure to electromagnetic radiation from an image, a color filter positioned between the photosensitive semiconductor device and the electromagnetic radiation, a field effect transistor having a fourth control gate, a fourth drain connected to the cathode of the photosensitive semiconductor device, and a fourth source connected to the anode of the photosensitive semiconductor device, the fourth source of the field effect transistor and the anode of the photosensitive semiconductor device being further connected to the first, second, and third control gates; and a diode having an anode connected to the first, second, and third control gates, the method comprising:

applying a negative voltage to the cathode of the diode to erase the first, second, and third floating gate semiconductor devices;

applying a positive voltage to the cathode of the diode to reset the photosensitive semiconductor device;

applying a high voltage to the second source, a low voltage to the first and third sources, and filtering blue from passing through the color tunable filter; and applying a high voltage to the third source, a low voltage to the first and second sources, and filtering red from passing through the color tunable filter.

18. The method of claim 17 further comprising:

applying a programming voltage to the fourth source; and applying a high voltage to the first source, a low voltage to the second and third sources, and allowing all colors to pass through the color tunable filter.

19. The method of claim 17 further comprising:
applying a read voltage to the fourth source; and
reading the current on the first, second, and third sources.

20. The image sensor of claim 3 wherein the photosensitive semiconductor device is a photodiode having an anode and a cathode.

21. An image sensor comprising:
a first floating gate semiconductor device having a first floating gate, a first control gate, a first drain and a first source;
a second floating gate semiconductor device having a second floating gate, a second control gate, a second drain and a second source;
a third floating gate semiconductor device having a third floating gate, a third control gate, a third drain and a third source;
a photosensitive semiconductor device positioned for exposure to electromagnetic radiation from an image, wherein the photosensitive semiconductor device is a photodiode having an anode and a cathode;
a color tunable filter positioned between the photosensitive semiconductor device and the electromagnetic radiation, wherein the color tunable filter comprises a first cholesteric liquid crystal filter tuned to pass Left-circularly polarized electromagnetic radiation and a second cholesteric liquid crystal filter tuned to pass Right-circularly polarized electromagnetic radiation; and
a pixel control circuit connected to direct the first, second, and third floating gate semiconductor devices and the photosensitive semiconductor device to a plurality of controlled modes, wherein the pixel control circuit comprises:
a field effect transistor having a switch, a fourth control gate, a fourth drain connected to the cathode of the photodiode, and a fourth source connected to the anode of the photodiode, the fourth source and the anode of the photodiode being further connected to the first, second, and third control gates; and
a diode having an anode connected to the first, second, and third control gates, and the controlled modes including:
an erase mode in which at least a portion of an electric charge is removed from the first, second, and third floating gates to place the first, second, and third floating gate semiconductor devices, respectively in an initialized state; and
an exposure mode in which the first, second, and third floating gates are charged at least partially in response to a voltage at a terminal of the photosensitive semiconductor device while being sequentially selected as the color tunable filter allows all desired combinations of colors to pass, the voltage at the terminal corresponding to exposure of the photosensitive semiconductor device to the electromagnetic radiation from the image.

22. The image sensor of claim 21 wherein the erase mode comprises the field effect transistor switch and the first, second, and third floating gate semiconductor devices in non-conductive states, the photodiode at an initial voltage state, and the first, second, and third floating gates discharging through the diode.

23. The image sensor of claim 21 wherein the exposure mode comprises the field effect transistor switch and the diode each in a non-conductive state, the cathode of the photodiode raised to an exposure voltage level, and the first, second, and third drains and the first, second, and third source of the floating gate semiconductor devices having a voltage thereacross sufficient to charge the first, second, and third floating gates, respectively, in response to voltage levels at the anode of the photodiode.

24. The image sensor of claim 21 wherein the data retention mode comprises the field effect transistor switch and the diode each in a non-conductive state, the cathode of the photodiode at a retention voltage level, and the first, second, and third sources are effectively open circuited.

25. The image sensor of claim 21 wherein the read mode comprises a predetermined voltage at the first, second, and third control gates and a current between the first, second, and third drains and the first, second, and third sources, respectively indicative of the charge placed on the first, second, and third floating gates, respectively, during the exposure mode.

* * * * *